United States Patent Office 3,557,032
Patented Jan. 19, 1971

3,557,032
PROCESS FOR PREPARING A SOLID POLY-URETHANE HAVING A LONG POT-LIFE
John C. Zemlin, Reading, Mass., assignor to Liner Technology, Inc., Burlington, Mass., a corporation of Massachusetts
No Drawing. Continuation-in-part of applications Ser. No. 455,627, May 13, 1965, and Ser. No. 496,155, Oct. 14, 1965. This application Apr. 9, 1969, Ser. No. 814,819
Int. Cl. C08g 22/40
U.S. Cl. 260—18
5 Claims

ABSTRACT OF THE DISCLOSURE

A process for making substantially non-porous, solid polyurethane which comprises forming said polyurethane from a curable composition containing a mixture of a polyisocyanate, an active hydrogen-containing compound, e.g., a polyol, and a lead salt-containing catalyst which is inactive at room temperature, heating said composition to a temperature of at least about 100° C. to activate said catalyst and to form the substantially non-porous, solid polyurethane.

---

This application is a continuation-in-part of Ser. No. 496,155, filed Oct. 14, 1965, now abandoned and Ser. No. 455,627, filed May 13, 1965 now U.S. Pat. No. 3,474,075.

This invention relates to a novel process for the catalytic formation or curing of substantially non-porous, solid polyurethane.

The execellent physical properties of polyurethane plastics are well known. It is also well known to prepare non-porous molded polymeric plastics having

groups in the polymer chain (such as polyurethanes and polyureas) by pre-mixing a polyfunctional alcohol or amine and a polyisocyanate, with or without catalyst, casting or otherwise shaping the mixture and then curing the mixture, frequently with heat and pressure. The resulting cured plastic is mostly commonly a cross-linked elastomer. Attempts have been made to prepare such elastomers in production line operations, but these efforts were usually unsuccessful. When the reactive compositions were so compounded, e.g., in the absence of a catalyst, to give a long enough work or "pot life" and to permit normal handling, the curing time was too long. If elevated temperatures were used in an attempt to shorten the curing time of such compositions, a random set of undesirable by-products ensued as a result of various secondary reactions. Furthermore, from a practical standpoint the use of heating alone is inadequate because the desired reaction does not proceed fast enough. On the other hand, when catalysts were used to give a short curing time, the work life of the mixture at room temperature was so short as to make normal handling impractical.

The desirability of having polyurethane-forming composition with a long pot life without detracting from the curing time has been recognized in this art. Numerous approaches have been previously suggested such as the use of block isocyanates, a polyepoxide in place of the polyol, special solvents, acids or acid chlorides, methyl ethyl ketone, and the like. These approaches have the disadvantage of requiring either the use of special reactants, pretreatment of the usual reactants, or the introduction of extraneous materials into the system and thereby contaminating the polyurethane. Moreover, in some instances undesirable by-products including gases are formed during curing.

One object of this invention is to provide a new castable polyurethane-forming composition which has a reasonably long work life after its components have been mixed and which avoids the disadvantages of the prior art approaches.

Another object of this invention is to provide a catalyst-containing composition for preparing polyurethane which is stable enough to be readily handled, worked and shaped at ambient or room temperature but which may be cured quickly upon heating to a temperature of at least about 100° C.

Still another object of this invention is to provide a novel process suitable for the manufacture of polyurethane plastics in commercial operations.

Other objects of this invention will be apparent from the following detailed description and claims. In this description and claims all proportions are by weight unless otherwise indicated.

In accordance with one aspect of this invention, there is incorporated in the polyurethane-forming composition a lead salt which acts as a latent, heat-activable catalyst. The resulting mixture has a long work life and may be kept in its unreacted state at room temperature for long periods, up to several hours, and often as long as 8 hours or more. On heating, for example, to a temperature above 100° C., but preferably not above 200° C., e.g. at about 110–150° C., the catalyst is activated and the reaction proceeds very rapidly, i.e., at a much faster rate than in the absence of the latent catalyst. It is also important that the polyurethane-forming composition, or the so-called curable mixture, be free of catalysts which are active at ambient conditions such as room temperature or even elevated temperatures such as 50° to 60° C.

The lead salts used as the latent catalyst in the practice of this invention are represented by the general formula:

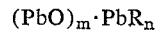

wherein R is an organic or inorganic acidic anion, $n$ is a whole number or fraction such that the divalent Pb is satisfied, and $m$ is an integer from 0 to 5, preferably 0 to 3. Illustrative catalysts include:

Normal lead stearate
Normal lead palmitate
Dibasic lead phthalate
Dibasic lead palmitate-stearate
Normal lead citrate
Normal lead maleate
Normal lead fumerate
Tribasic lead acetate
Tribasic lead 2-ethylhexoate
Tribasic lead maleate
Dibasic lead phosphite, etc.

It has been found that the lead salt-containing compounds which are effective as latent catalysts in the practice of this invention are those which have a solubility in 400 molecular weight polypropylene glycol of less than 0.01%, but greater than 0.00001% by weight at 25° C. In general, highly polar inorganic anions such as sulfate, carbonate, etc. make the salts too insoluble; while highly non-polar, non-crystallizing organic anions such as naphthenate, 2-ethylhexoate, butyrate, and the like tend to promote solubility in polyurethane-forming compositions and reactivity at room temperature.

The fact that certain lead compounds function as catalysts despite their low apparent solubility in polyurethane-forming compositions is surprising. In practice, they are most advantageously added to such compositions by a high shear procedure such as ball milling, mixing on a paint mill or using a very high speed stirrer. The resulting compositions, even if clear when uncatalyzed, tend to be opaque or translucent at room temperature, indicating the insolubility of the catalysts. These catalysts show relatively little catalytic activity at room temperaure. In fact, one of the criteria of the latent catalysts of this invention is that in a polyisocyanate polyol mixture, gelation will not be produced for sufficient time to permit working of the mixture. Usually this means a "pot life" of preferably several hours. It should be understood, however, that some polyisocyanates are a great deal more reactive than others. Thus other things being equal, a primary hydroxyl group will react with an isocyanate group much faster than a secondary hydroxyl group; and a catalyzed mixture of polyphenylene polyisocyanate and diethylene glycol (primary hydroxyl) will have a shorter pot life than an identical mixture in which dipropylene glycol (secondary hydroxyl) is substituted for the diethylene glycol. At best the catalysts of this invention will not shorten the uncatalyzed work life of the mixture.

Despite the low activity of these lead salts at normal temperature, it has been discovered that on heating they become very active catalysts. The temperature at which the lead salts become active will vary somewhat; but, in general, the activating temperature will range from about 100° C. to 200° C., and the preferred activation temperature range from about 110° C. to 150° C.

In preparing the compositions of this invention any organic polyisocyanate may be used; for example, 2,4- and 2,6-tolylene diisocyanate, 4,4-diphenylmethane diisocyanate, 1,4-phenylene diisocyanate, 1,4-cyclohexane-diisocyanate, 4,4 - diphenyldimethylmethanediisocyanate, hexamethylenediisocyanate, dianisidenediisocyanate and the like.

Often it is preferred to prepare a prepolymer by reacting a molar excess of one or more of the above isocyanates with a polyol to form a higher molecular weight and less volatile polyisocyanate, which can then be further reacted with additional polyol, or other active hydrogen-containing compound, to form the final product. As a source of active hydrogen compounds for reaction with the polyisocyanates, polyether polyols or polyalkylene ether glycols are usually preferred owing to their lower cost. Alternatively, however, hydroxyl terminated polyesters can be used, a wide variety of diols and triols and, in fact, any molecule which has at least two active hydrogens as determined by the Zerewitinoff method.

As illustrative examples of suitable diols are ethylene glycol, propylene glycol, butylene glycol-2,3, butylene glycol-1,3, 2-methyl pentanediol-2,4, 2-ethylhexanediol-1,3, hexamethylene glycol, decamethylene glycol, styrene glycol, triethylene glycol, tetraethylene glycol, polyethylene glycols such as those of average molecular weights of 200, 400, 600 and up to 4000 and higher, dipropylene glycol, tripropylene glycol, and polypropylene glycols such as those of average molecular weights of 400, 750, 1200, 2000 and up to 4000 and higher. Other diols which may be used as monoethers of tri-hydroxy compounds such as glyceryl-alpha-allyl ether, glyceryl-alpha-phenyl ether, glyceryl-alpha-isopropyl ether, hydroxy esters such as esters (incuding polyesters) prepared from 1 mol of dibasic acid (such as adipic acid or the dimer of linoleic acid) and 2 moles of dihydric alcohol, esters (including polyesters) prepared from hydroxy acids and dihydric alcohols in mol ratios of 0.5–1:1, and esters of 1 mol of trihydroxy compound and 1 mol of a monobasic acid, such as the monoglyceride of eleostearic acid. Also useful are polyesters prepared by reacting a lactone with a polyol initiator as for example the reaction product of excess E-caprolactone with ethylene glycol. Dihydric phenols such as catechol, resorcinol and 2,2-bis(4-hydroxyphenyl) propane may also be employed as the diols. Examples of trihydroxy compounds are glycerine, triethanolamine, pyrogallol, phloroglucinol, monoethers of tetrahydroxyl compounds such as the monobutyl ether of pentacrythritol, esters of hydroxy acids and trihydroxy compounds in mol ratio of ⅓–1:1, such as glycerine triricinoleate, monoesters of monobasic acids and tetra-hydroxy compounds such as pentacrythritol monooleate. Examples of tetrahydroxy compounds are pentacrythritol and its alkylene oxide condensates as well as esters of 1 mol of dibasic acid (e.g. adipic acid) and 2 mols of trihydroxy-compound (e.g. trimethylolpropane). Arabitol, xylitol, sorbitol, dulcitol and mannitol are examples of suitable pentahydroxy and hexahydroxy compounds.

The use of various fillers such as carbon black, $TiO_2$, $SiO_2$, $CaCO_3$, etc.; extenders such as vinyl plasticizers, chlorinated hydrocarbons, coal tar pitch, etc.; antioxidants, color stabilizers, flame proofing agents such as the organic phosphates; and other additives well known in the art is contemplated in the compositions of this invention.

The blends of polyisocyanate, polyol, or other active hydrogen-containing material, and latent catalyst are generally syrups or, in some cases, non-viscous liquids. For casting purposes, it is desirable, as is well known in the art, to use a blend substantially free of volatile solvents. For coatings which may be applied, for example, to wood furniture or metal panels a volatile solvent or diluent for dissolving or dispersing the reactive composition may be employed, if desired, and may be evaporated before or during the final cure. In either case, the solid product is substantially non-porous. It is also within the broad aspects of this invention to use the reactive compositions, containing the latent catalysts, along with inert fillers and other additives to form a powder and to apply this powder to a heated substrate by the known techniques of coating with fluidized beds. The compositions may also be applied as gels; for example, by knife coating onto a cloth or paper substrate and then heating to obtain a cured coating. Depending on the choice of the known reactive components, as is well understood in the art, the cured products can be thermosetting or thermoplastic, and can range from soft elastomers to hard brittle solids.

The heating of the compositions employed in the practice of this invention may advantageously be effected by baking in a hot air or infrared oven; by dielectric heating; by conduction as in a steam or electrically heated mold or through a heated substrate onto which the composition has been coated; by submerging them in a hot inert fluid, such as a silicone oil; or by other means well known in the art.

The proportion of the latent catalyst in the curable mixture may be varied to some extent in accordance with the desired curing rate. Small amounts of catalyst, e.g., on the order of 1% are very effective. Advantageously the proportion of catalyst is in the range of about 0.01 to 5%, preferably in the range of about 0.1 to 2% of the total composition. Frequently amounts below 0.01 to 0.05% will produce no effect, whereas the effect of catalyst concentrations above 0.5% will be largely independent of concentrations.

The following embodiments are presented to illustrate further this invention:

EXAMPLE 1

An isocyanate terminated prepolymer was prepared from one mol of a 400 molecular weight triol (TP440—Wyandotte Chemical Co.—a propylene oxide adduct of trimethylolpropane) and 3 mols of Hylene TM, a commercial grade of 80% 2,4- and 20% 2,6-tolylene diisocyanate. The prepolymer had an equivalent weight of 310. To a 31 gram portion was added a mixture of 30 grams of hydroxyl-terminated ethyleneglycoladipic acid polyester having a hydroxyl number of 168; 2 grams Santocel C, a finely divided silica; 0.6 gram catalyst and 1 gram $TiO_2$. All ingredients but the prepolymer were first mixed on a laboratory paint mill and then at room temperature added to the prepolymer, which was mixed by hand avoiding the incorporation of air. The final mixture was a thixotropic gel which was coated with a draw down blade to a thickness of 10 mils on kraft paper. The paper was then exposed to a 170° C. air blast for 45 sec. and was subsequently cooled with air with the following results:

| Catalyst | Strike through | Amount of cure | Room temp. pot life of coating |
|---|---|---|---|
| None | Considerable | None | Over 8 hrs. |
| Normal lead stearate | None | Complete | Do. |
| Lead phthalate, dibasic | Slight | do | Do. |
| Normal lead citrate | None | do | Do. |
| Lead stearate, dibasic | do | do | Do. |
| Dibutyltindilaurate | Gelled during final mixing. | | 1 min. |
| Methyldiethanolamine | Moderate | Partial | 20 min. |

The last two catalysts, dibutyltindilaurate and methyldiethanolamine, were included as representative of catalysts being used today for curing of polyurethane resins. The limited pot life of the catalyzed compositions resulting from the use of these two catalysts is evident.

EXAMPLE 2

An isocyanate terminated prepolymer was prepared from one mol of a 2500 molecular weight trimethylpropane-initiated triol of polypropyleneglycol (i.e. a reaction product of trimethylolpropane and propylene oxide) and 2.5 mols of Hylene TM, a commercial grade of 80% 2,4- and 20% 2,6-tolylene diisocyanate. The resulting prepolymer had an equivalent weight of 1202 with an available NCO content of 3.5%. A series of compositions were prepared by adding 10.2 grams of this prepolymer to 5.2 grams of a 1000 molecular weight polypropylene glycol diol and 0.15 gram of the below listed catalyst. Each mixture was stirred vigorously and then a 0.15 cc. portion was placed on aluminum plate inclined at 20° from the horizontal and maintained at 150° C. The time for the sample to gel as evidenced by cessation of movement down the plate was measured as follows:

| | Time to gelation | | |
|---|---|---|---|
| Catalyst | 150° C. (sec.) | R. T. (hrs.) | Appearance R. T. (24 hrs.) |
| Normal lead stearate | 18 | 12+ | Liquid. |
| Normal lead palmitate | 18 | 12+ | Do. |
| Normal lead citrate | 23 | 12+ | Do. |
| Normal lead maleate | 11 | 12+ | Viscous liquid |
| Lead phthalate, dibasic | 26 | 12+ | Liquid. |
| Lead maleate, tribasic | 44 | 12+ | Do. |
| Lead 2-ethylhexoate, dibasic | 25 | 12+ | Do. |
| Lead acetate, tribasic | 26 | 12+ | Do. |
| None | 240+ | 12+ | Do. |
| Dibutyltindilaurate | 4 | ½ | Soft rubber. |

EXAMPLE 3

An isocyanate-terminated prepolymer was prepared from 2 equivalents of a 700 mol. wt. polypropyleneglycol diol, 3 equivalents of a 750 mol. wt. trimethylolpropane-initiated polypropyleneglycol triol and 10.5 equivalents of Hylene TM, a commercial grade of 80% 2,4- and 20% 2,6- tolylene diisocyanate. The resulting prepolymer had an equivalent weight of 442 and a free NCO content of 9.6%. A number of catalytic materials were tested with this prepolymer by first mixing 0.10 gram of catalyst in 0.437 gram of trimethylolpropane previously dissolved in 0.45 gram of 1,4-butanediol. 8.82 grams of prepolymer were then added with thorough mixing at room temperature. A 0.15 cc. portion was then placed on an aluminum plate inclined at 20° from the horizontal and maintained at 150° C. The time for the sample to gel as evidenced by cessation of movement down the plate was measured as follows:

| | Time to gelation | |
|---|---|---|
| Catalyst | 150° C. (sec.) | R. T. (hrs). |
| Normal lead stearate | 14 | 12+ |
| Normal lead citrate | 16 | 12+ |
| Lead phthalate, dibasic | 26 | 12+ |
| Lead maleate, tribasic | 45 | 12+ |
| Normal lead maleate | 10 | 12 |
| Lead 2-ethylhexoate, dibasic | 21 | 12+ |
| Lead acetate, tribasic | 18 | 12+ |
| Normal lead palmitate | 13 | 12+ |
| Dibutyltindilaurate | 4 | 1/60 |
| None | 180 | 12+ |

EXAMPLE 4

A prepolymer was prepared by reacting one mol of a 2000 molecular weight diethyleneglycol-initiated polyester of a e-caprolactone with two mols of p-phenylene diisocyanate. The resulting viscous liquid was mixed at room temperature with 1,4-butane diol at an NCO to OH ratio of 1:2. This mixture was then divided into small equal portions, and to each portion 1% by weight of a catalyst was added. 0.15 cc. of each portion was then placed on an inclined plane, kept at 150° C. and the time for loss of mobility noted:

| | Time to gelation | | |
|---|---|---|---|
| Catalyst | 150° C. (sec.) | R. T. (hrs.) | Appearance R. T. (24 hrs.) |
| Normal lead stearate | 9 | 12 | Very viscous liquid. |
| Lead phthalate, dibasic | 14 | 12+ | Do. |
| Lead maleate, tribasic | 22 | 12+ | Do. |
| Normal lead laurate | 9 | 12 | Do. |
| Dibutyltindilaurate | 6 | ½ | Firm rubber. |
| None | 180+ | 12+ | Very viscous liquid. |

EXAMPLE 5

A mixture of 50 grams of Carwinate 125M (a technical grade of diphenylmethanediisocyanate containing about 11% 2,4'-isomer and 89% 4,4'-isomer), 90 grams of PPG 1025 (a commercial 1000 molecular weight polypropylene glycol), and 26 grams of TP 440 was prepared at 30° C. and to which was then added 50 grams of Atomite (a commercial grade of powdered CaCO$_3$) and 10 grams of rutile, TiO$_2$. The resulting paste was degassed at 1 mm Hg for 10 minutes and then divided into portions of 22.6 grams. Catalysts were mixed into the portions and then equal samples of each portion placed in a 150° C. heated metal mold having a cavity measuring ¼" x ¼" x ³⁄₃₂" deep. After 60 seconds the cavity was emptied and the casting examined as follows:

| Catalyst | Appearance of casting | Pot life at R. T. of unused portion (hrs.) |
|---|---|---|
| None | Liquid | 12+ |
| Triethylenediamine | do | ½ |
| Lead phthalate, dibasic | Firm rubber | 12+ |
| Lead maleate, tribasic | do | 12+ |
| Lead palmitate, dibasic | do | 12+ |
| Normal lead stearate | do | 12+ |

The above data clearly show that the lead salts of this invention can be effectively employed as latent catalysts in the preparation of polyurethane plastics. More specifically, it has been demonstrated that substantially increased pot life was achieved in conjunction with excellent gelation times at elevated temperature. Castings prepared in accordance with the present invention have an excellent appearance.

EXAMPLE 6

An isocyanate terminated prepolymer was prepared from one mol of a 2500 molecular weight trimethylpropane-initiated triol of polypropyleneglycol (i.e., a reaction product of trimethylolpropane and propylene oxide) and 2.5 mols of Hylene TM, a commercial grade of 80% 2,4- and 20% 2,6-tolylene diisocyanate. The resulting prepolymer had an equivalent weight of 1202 with an available NCO content of 3.5%. A series of compositions were prepared by adding 10.2 grams of this prepolymer to 5.2 grams of a 1000 molecular weight polypropylene glycol diol and 0.15 gram of the below listed catalyst. Each mixture was stirred vigorously and then a 0.15 cc. portion was placed on aluminum plate inclined at 20° from the horizontal and maintained at 110° C. and 150° C. The time for the sample to gel as evidenced by cessation of movement down the plate was measured as follows:

| Catalyst | Time to gelation | | | Appearance R.T. (48 hrs.) |
|---|---|---|---|---|
| | 150° C. (sec.) | 110° C. (sec.) | R.T. (hrs.) | |
| Normal lead stearate | 14 | | 48+ | Very viscous liquid. |
| Normal lead palmitate | 18 | 25 | 48+ | Do. |
| Normal lead laurate | 18 | 25 | 48+ | Do. |
| Normal lead octoate (2-ethyl hexoate) | 12 | 18 | ½ | Soft rubber. |
| Normal lead acetate | 16 | 25 | 2 | Do. |
| Control | 240+ | 1,200+ | 48+ | Very viscous liquid. |

The above data show that lead salts such as normal lead octoate and normal lead acetate do not provide the work or pot life at room temperature provided by such lead salts as normal lead stearate, normal lead palmitate and normal lead laurate.

EXAMPLE 7

To a 100 gm portion of a commercial 400 M.W. polypropylene-glycol (Niax Diol PPG 425) was added 1 gm of a lead salt. Each mixture was then rotated at room temperature for 24 hours and then let stand for three more days. Each sample was then filtered through Whatman #42 filter paper and analyzed for lead content by emission and/or atomic absorption spectroscopy.

| Sample | Lead salt | Analysis of solutions | |
|---|---|---|---|
| | | Pb, p.p.m. | Percent lead salt in solution |
| A | Normal lead stearate | 0.5 | .00019 |
| B | Normal lead palmitate | 1.3 | .00045 |
| C | Normal lead laurate | 0.4 | .00018 |
| D | Normal lead octoate (2-ethyl hexoate) | 3,200 | .77 |

The data in Example 7 show that normal lead octoate does not meet the solubility requirements of the latent lead salts of this invention.

While particular embodiments of this invention are shown above, it will be understood that the invention is obviously subject to variations and modifications without departing from its broader aspects.

What is claimed is:

1. A process for the preparation of substantially non-porous, solid polyurethane products which comprises the following sequential steps:
   (A) forming under ambient temperature conditions an uncured product from a long work life curable mixture containing a polyisocyanate, a polyol and a solid, latent catalyst selected from the group consisting of normal lead citrate, dibasic lead phthalate, tribasic lead 2-ethylhexoate, and tribasic lead maleate, said latent catalyst having a solubility in 400 molecular weight polypropylene glycol of less than 0.01% but greater than 0.00001% by weight at 25° C., the curable mixture further characterized in being free of catalysts which are active and would cure said mixture under ambient conditions; and
   (B) heating the resulting uncured product to a temperature of at least 100° C. to activate said latent catalyst whereby the mixture is cured.

2. The process of claim 1 wherein the latent catalyst is normal lead citrate.

3. The process of claim 1 wherein the latent catalyst is dibasic lead phthalate.

4. The process of claim 1 wherein the latent catalyst is tribasic lead 2-ethylhexoate.

5. The process of claim 1 wherein the latent catalyst is tribasic lead maleate.

References Cited

UNITED STATES PATENTS

| 3,039,976 | 6/1962 | Barnes et al. | 260—18X |
| 3,136,731 | 6/1964 | Piechota et al. | 260—2.5 |
| 3,179,627 | 4/1965 | Twitchett | 260—77.5 |
| 3,201,136 | 8/1965 | Harrison et al. | 260—77.5 |
| 3,203,932 | 8/1965 | Frisch et al. | 260—77.5 |
| 3,252,944 | 5/1966 | Curtis et al. | 260—77.5 |

FOREIGN PATENTS

| 1,160,171 | 12/1963 | Germany | 260—75 |
| 994,348 | 6/1965 | Great Britain | 260—77.5 |
| 970,497 | 9/1964 | Great Britain | 260—77.5 |
| 901,056 | 7/1962 | Great Britain | 260—77.5 |

DONALD E. CZAJA, Primary Examiner

C. W. IVY, Assistant Examiner

U.S. Cl. X.R.

117—21, 155; 260—37, 75, 77.5